Patented Aug. 26, 1952

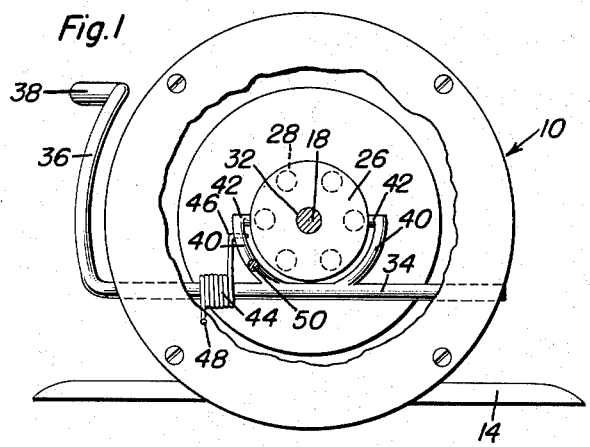
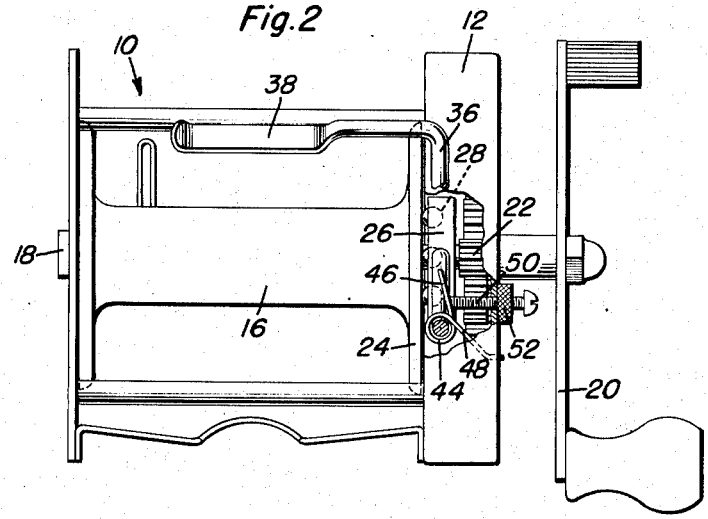
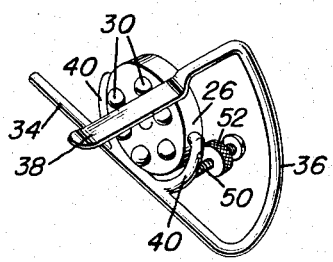
Martin Kadets
Vernon N. Moody
INVENTORS

2,608,358

UNITED STATES PATENT OFFICE 2,608,358

BACKLASH ELIMINATOR FOR FISHING REELS

Martin Kadets and Vernon N. Moody, Chandler, Ariz., assignors, by direct and mesne assignments, to Kareed Corporation, Cambridge, Mass., a corporation of Massachusetts Application October 19, 1950, Serial No. 190,975

4 Claims. (Cl. 242—84.5)

This invention comprises novel and useful improvements in a backlash eliminator for fishing reels and more specifically pertains to a friction brake for providing an adjustable drag for the rotation of fishing reels.

The primary object of this invention is to provide a fishing reel in which backlash may be readily eliminated and in which an adjustable resistance may be applied to oppose the rotation of the fishing reel as the fishing line is paid out by the playing of a fish.

A further object of the invention is to provide an adjustable friction brake or backlash controller for fishing reels which shall be so positioned with respect to the reel that the friction brake may be readily and accurately applied by the user with the same hand which controls the fishing rod and reel.

A still further object of the invention is to provide a friction brake for fishing reels which shall be of a very simplified and yet serviceable construction, and which will apply a controlled friction to the revolving bell of a fishing reel with a minimum of damage or wear upon the same.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view showing a fishing reel with the friction brake according to the principles of this invention applied thereto, a part of the reel structure being broken away;

Figure 2 is a rear elevational view of the fishing reel of Figure 1, a part of the casing of the framework of the same being broken away to show the internal construction thereof; and Figure 3 is a perspective view of the friction brake forming an element of the invention.

Referring now more specifically to the accompanying drawings, wherein like numerals designate similar parts throughout the various views, it will be seen that the invention is illustrated as applied to a conventional form of fishing reel indicated generally by the numeral 10, this fishing reel having a conventional supporting framework, including an annular housing or casing 12. The conventional reel further provides a base plate 14 whereby the same may be mounted upon the handle of a fishing rod in a conventional and well-known manner.

The fishing reel further includes a drum or spool 16 having a spindle 18 extending from the opposite ends thereof, and by means of which the reel or drum is rotatably mounted in the supporting frame.

The reel is, of course, provided with the customary handle 20 journaled in and extending into the housing 12 and having a gear 22 forming part of a gearing assembly by means of which the drum of the reel may be rotated in order to wind the fishing line when reeling in a fish.

Heretofore, it has been customary for fishermen, in playing game fish, and after the same have been hooked, to permit the reel to pay out the line under the lunges of the fish, but to apply a resistance to the unreeling of this line in order to maintain the line tight to prevent easy breaking of the same, and in order to tire the fish. For this purpose, the fisherman usually applies his thumb to the bell 24 of the reel, employing this frictional drag on the reel to prevent the development of backlash in the fishing line.

However, as will be readily apparent, this practice is frequently very tiring upon the hand and thumb of the fisherman and also is not very satisfactory for accurately adjusting the application of suitable frictional resistance to the rotation of the reel.

The present invention comprises a friction brake assembly adapted to be incorporated into a conventional fishing reel assembly as hereinbefore described, both to provide the braking force employed by the fisherman, and also to facilitate accurate adjustment of this braking force. For that purpose, there is provided a friction plate or pressure plate 26 consisting of a disk of metal or any other suitable material, provided with a plurality of ball-receiving pockets or recesses 28 on the pressure face of the pressure plate, that is, adjacent to the bell 24. A plurality of balls 30 are rotatably received in these recesses, pockets or seats, and are retained therein, these balls bearing directly against the bell 24. It will thus be apparent that as the drum 16 rotates, the balls 30 bearing thereagainst will rotate within the ball seats 28 in the pressure plate 26.

The pressure plate itself is provided with a central or axial aperture 32 by means of which the pressure plate is rotatively journaled upon the spindle 18 of the drum.

A finger-actuated operator is provided for urging the pressure plate against the bell to impart the desired frictional drag thereto. This operator consists of a rock shaft 34 which is rotatably or rockably journaled in the housing 12 as shown in Figure 1, and which at one end is provided with a lever arm 36 which is arcuated to closely conform to the circumference of the housing 12. At its outer end and extending perpendicularly therefrom, the lever arm 36 is provided with a finger-grip portion 38 which overlies and is disposed substantially adjacent to the center of the drum 16 as shown in Figure 2.

Intermediate its ends, the rock shaft 34 is provided with a pair of arcuate arms 40 having inturned ends 42 which are received in diametrically opposite bores in the periphery of the pressure plate 26. These arms 40 thus constitute a yoke by means of which the pressure plate is supported and whereby the pressure plate may be moved toward and from the bell as the finger grip lever is actuated to rock the shaft. A resilient means in the form of a coil spring 44 has a central portion loosely coiled about the rock shaft 34 and has one end 46 engaging one of the yoke members 40, while the other end 48 is engaged in a suitable aperture in the housing 12. This spring normally urges the pressure plate away from the bell, and obviously the fisherman by applying his thumb to the finger grip portion 38 can readily cause the rock shaft to urge the pressure plate against the bell and cause the balls 30 to apply a regulated friction or braking action to the rotating bell of the drum.

An adjusting means is provided for imparting a regulable load or pressure to the pressure plate. This means consists of an adjusting screw 50 threaded through the housing or casing 12 into abutting engagement with one of the arms 40. A lock nut 52 on the screw 50 abuts the housing 12 to maintain the screw 50 in adjusted position.

It will be apparent that by manipulating the screw 50, a regulated pressure may be applied to the arm 50 and thereby urge the pressure plate against the bell in opposition to the spring 44.

Since, from the foregoing, the construction and advantages of this invention are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. A fishing reel including a drum having a bell and a spindle, a frame in which said spindle is journaled, a friction brake for said reel comprising a pressure plate for bearing against said bell, a finger actuated operator for said pressure plate, said pressure plate having a plurality of ball seats, balls rotatably retained in said seats and engaging said bell, said finger actuated operator comprising a shaft journaled in said frame in a direction transverse of the axis of said spindle, a fork on said shaft engaging said pressure plate, a lever on said shaft for rocking the latter, said lever having an arcuate portion adjacent but spaced from said bell, the end of said lever overlying the mid-portion of said drum, and resilient means engaging said operator and said frame and urging said pressure plate away from said bell.

2. Apparatus according to claim 1 including means for imparting a regulable constant load to said pressure plate for urging the same against said bell.

3. Apparatus according to claim 2 in which said means for imparting a regulable constant load comprises an adjusting screw threaded through said frame and bearing against said fork.

4. A fishing reel including a drum having a bell and spindle, a frame in which said spindle is journaled, a friction brake for said reel comprising a pressure plate for bearing against said bell, a finger actuated operator for said pressure plate, one of said bell and pressure plate having a plurality of ball seats facing the other thereof, ball bearings rotatably retained in said seats between said plate and said bell, said finger actuated operator comprising a shaft journaled in said frame in a direction transverse of the axis of said spindle, a fork on said shaft engaging said pressure plate, a lever on said shaft for rocking the latter, said lever having an arcuate portion adjacent but spaced from said bell, the end of said lever overlying the mid-portion of said drum, and a spring engaging said operator and said frame and urging said pressure plate away from said bell.

MARTIN KADETS.
VERNON N. MOODY.

REFERENCES CITED

The following references are of record in the file of this patent:

UNITED STATES PATENTS

| Number | Name | Date |
| --- | --- | --- |
| 806,494 | Pyott, Jr. | Dec. 5, 1905 |
| 1,353,113 | Deets | Sept. 14, 1920 |
| 2,528,926 | Von Pein | Nov. 7, 1950 |

FOREIGN PATENTS

| Number | Country | Date |
| --- | --- | --- |
| 23,229 of 1906 | Great Britain | July 18, 1907 |